US011048559B2

(12) United States Patent
Thirumalai et al.

(10) Patent No.: US 11,048,559 B2
(45) Date of Patent: Jun. 29, 2021

(54) MANAGING OWNERSHIP TRANSFER OF FILE SYSTEM INSTANCE IN VIRTUALIZED DISTRIBUTED STORAGE SYSTEM

(71) Applicant: HEWLETT PACKARD ENTERPRISE DEVELOPMENT LP, Houston, TX (US)

(72) Inventors: Dhanwa Thirumalai, Bangalore (IN); Jothivelavan Sivashanmugam, Bangalore (IN); Ashok Ramakrishnan, Apex, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/505,621

(22) Filed: Jul. 8, 2019

(65) Prior Publication Data

US 2021/0011776 A1    Jan. 14, 2021

(51) Int. Cl.
  *G06F 3/06*   (2006.01)
  *G06F 9/50*   (2006.01)
  *H04L 29/08*  (2006.01)

(52) U.S. Cl.
  CPC .......... *G06F 9/5077* (2013.01); *G06F 3/0604* (2013.01); *G06F 3/067* (2013.01); *G06F 3/0616* (2013.01); *G06F 3/0646* (2013.01); *G06F 3/0662* (2013.01); *H04L 67/1097* (2013.01)

(58) Field of Classification Search
  None
  See application file for complete search history.

(56) References Cited

U.S. PATENT DOCUMENTS

| 6,732,289 | B1 * | 5/2004 | Talagala | G06F 11/2092 714/6.3 |
| 6,978,398 | B2 | 12/2005 | Harper et al. | |
| 6,986,076 | B1 * | 1/2006 | Smith | G06F 11/004 714/4.11 |
| 6,996,752 | B2 * | 2/2006 | Hetrick | G06F 11/1092 714/710 |

(Continued)

OTHER PUBLICATIONS

@bmj0114, "Understanding Failover Cluster in Windows Server," Dec. 10, 2017, pp. 1-20 (online), Increments Inc., Retrieved from the Internet on Mar. 29, 2019 at URL: <qiita.com/bmj0114/items/a18c137667805f075b62>.

(Continued)

*Primary Examiner* — Elias Mamo
(74) *Attorney, Agent, or Firm* — Hewlett Packard Enterprise Patent Department (57) ABSTRACT

Example implementations relate to managing ownership transfer of a file system instance in a virtualized distributed storage system. The virtualized distributed storage system includes a first node having a first virtual controller that acts as an owner of a file system instance in a distributed storage, and a second node having a second virtual controller coupled to the first node over a network. A failure condition associated with a first node is detected. Further, in response to detection of the failure condition, an ownership of the file system instance may be transferred from the first virtual controller to the second virtual controller no later than an IP address switchover of the first virtual controller.

20 Claims, 6 Drawing Sheets

(56) References Cited

U.S. PATENT DOCUMENTS

| | | | |
|---|---|---|---|
| 7,043,663 B1* | 5/2006 | Pittelkow | G06F 11/2092 714/4.4 |
| 7,248,589 B2* | 7/2007 | Banerjee | H04L 29/06 370/395.32 |
| 7,908,445 B2* | 3/2011 | Schnapp | H04L 45/14 711/114 |
| 9,342,417 B2 | 5/2016 | Usgaonkar et al. | |
| 9,424,301 B2 | 8/2016 | Dhavale et al. | |
| 9,426,023 B2* | 8/2016 | Chennamsetty | H04L 49/354 |
| 10,616,361 B2* | 4/2020 | Gerdfeldter | H04L 67/2814 |
| 2004/0117345 A1 | 6/2004 | Bamford et al. | |
| 2006/0190760 A1* | 8/2006 | Saika | G06F 11/2025 714/4.1 |
| 2017/0315522 A1* | 11/2017 | Kwon | H04L 61/2007 |
| 2018/0356989 A1 | 12/2018 | Meister et al. | |

OTHER PUBLICATIONS

Dell Inc., "Dell EMC Unity: High Availability," White Paper, Jan. 2019, pp. 1-23.

Dell Inc., "High Availability and Data Protection with Dell EMC ISILON Scale-Out NAS," White Paper, Apr. 2019, pp. 1-38.

Oracle, "Maximize Availability with Oracle Database 12c," White Paper, Mar. 2017, pp. 1-34, Release 2.

\* cited by examiner

MANAGING OWNERSHIP TRANSFER OF FILE SYSTEM INSTANCE IN VIRTUALIZED DISTRIBUTED STORAGE SYSTEM

BACKGROUND

Computing systems may store data. Data may be served via storage protocols. Computing systems may operate to store data with high or continuous availability. For example, data may be replicated between computing systems in a failover domain, and a computing system may take over storage access responsibilities for a failed computing system.

BRIEF DESCRIPTION OF THE DRAWINGS

Various examples will be described below with reference to the following figures.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Data may be stored on computing systems, such as, but not limited to, servers, computer appliances, workstations, storage systems, or converged or hyperconverged systems. To store data, some computing systems may utilize a data virtualization platform that abstracts, into a distributed storage (i.e., virtualized or logical storage), aspects of a physical storage on which the data is physically stored (e.g., aspects such as addressing, configurations, etc.). The physical storage may be implemented using hardware, such as, hard disk drives, solid state drives, and the like. The distributed storage may be referenced by a user environment (e.g., to an operating system, applications, processes, etc.). The distributed storage may also provide data services such as deduplication, compression, replication, and the like. In some implementations, the distributed storage may be implemented, maintained, and managed, at least in part, by a virtual controller.

The distributed storage may be established and maintained by one or more virtual controllers according to various examples described herein. A virtual controller may be a virtual machine executing on hardware resources, such as a processor and memory, with specialized processor-executable instructions to establish and maintain the distributed storage.

In some instances, the distributed storage may be object-based. An object-based distributed storage may differ from a block level storage platform and a file level storage platform, although an object-based distributed storage may underlie block level storage protocols or file level storage protocols, in some implementations. In general, the block level storage platform may be implemented in storage area networks and is presented via a storage protocol such as Internet Small Computer System Interface (iSCSI) or Fibre Channel, whereas the file level storage platform may be implemented as a virtual file system which manages data in a file hierarchy and is presented via a file protocol such as Network File System (NFS), Server Message Block (SMB), or Common Internet File System (CIFS).

In the object-based distributed storage, data may be stored as objects in an object store. User accessible files and directories may be made up of multiple objects. Each object may be identified by a signature (also referred to as an object fingerprint), which, in some implementations, may include a cryptographic hash digest of the content of that object. The signature can be correlated to a physical address (i.e., disk location) of the object's data in an object index. Objects in the object-based distributed storage may be hierarchically related to a root object in an object tree (e.g., a Merkle tree)

or any other hierarchical arrangement (e.g., directed acyclic graphs, etc.). The hierarchical arrangement of objects may be referred to as a file system instance or a hive. In some instances, one or more file system instances may be dedicated to an entity, such as a particular virtual machine/virtual controller, a user, or a client. Objects in the object store may be referenced in the one or more file system instances.

A client (e.g., a guest virtual machine or a guest virtual controller) may connect to an IP address (also referred to as a storage IP address) of a virtual controller that manages a file system instance in the distributed storage via a file protocol mount point (e.g., an NFS or SMB mount point). A file at a protocol level (e.g., user documents, a computer program, etc.) may be made up of multiple data objects within the distributed storage.

In order to provide high or continuous availability of data, computing systems participating a virtualized distributed network may be arranged into failover domains. For example, a failover domain may be a networked cluster of computing systems, also referred to as a cluster of nodes. In some cases, data may be replicated between two or more nodes in the cluster. Occasionally, a node may become unavailable to service client requests to access data. Unavailability of the node may arise, for example, due to a network partition, a partial or complete failure of that node, a disconnection of that node from the network, or other situations. In case of such unavailability, another node in the cluster (also referred to as a "failover node") may take over responsibility/ownership for servicing requests intended for the unavailable node according to a failover routine, using a local replica of some or all of the unavailable node's data or a replica stored on another node in the cluster. In case of such unavailability/failures, it is desirable that upcoming data access requests are successfully directed to the failover node, as early as possible. In order for the failover node to be able to serve the data access requests, an ownership of a file system instance in the distributed storage needs to be transferred to the replica node. In some examples, the ownership of the file system instance includes rights to perform operations, such as but not limited to, open, read, write, rename, move, close, or combinations thereof, on the file system instance.

In some examples, upon failure of a node previously serving as an owner of the file system instance, ownership transfer of the file system instance is triggered after receipt of any data access request by the failover node. In fact, the data access request can only be received by the failover node after a successful IP address switchover to the failover node. The term "IP address switchover" may refer to a process of assigning an IP address of the failed node (or virtual controller) to another node (or virtual controller). In some examples, the IP address of the virtual controller of the failed node may be assigned to a virtual controller of the failover node.

Once the IP address switchover is completed, even though the data access request is received by the failover node, the failover node cannot serve the data access request until an ownership of the file system instance is transferred to the failover node. Also, disadvantageously, such process of ownership transfer may lead to increased CPU utilization, network bandwidth utilization, and latency. Moreover, certain hypervisors may place stringent time requirements on data storage availability to keep the guest virtual machines running, and delays in ownership transfer may exceed the time requirements, thus causing data storage unavailability and causing a hypervisor to pause operations of the virtual machines or shutdown the virtual machines.

Various example proactive approaches are presented herein to manage failover in a virtualized distributed storage system. For example, the virtualized distributed storage system of the present disclosure may include a first node including a first virtual controller and a second node coupled to the first node via a network. The second node includes a second virtual controller. The virtualized distributed storage system may further include a distributed storage that is accessible by one or both of the first virtual controller and the second virtual controller. The distributed storage may include a file system instance, where the first virtual controller is an owner of the file system instance.

In some examples, the second virtual controller detects a failure condition associated with the first node. Further, the second virtual controller initiates an ownership transfer of the file system instance from the first virtual controller to the second virtual controller while holding (i.e., temporarily delaying or postponing) completion of an IP address switchover of the first virtual controller. Moreover, the second virtual controller completes the ownership transfer of the file system instance to the second virtual controller no later than the IP address switchover.

Various examples described herein may facilitate a proactive transfer of the ownership of a file system instance from one node to another node in the event of failure in the virtualized distributed storage system. By way of example, when the first node (i.e., a current owner of the file system instance) fails, the ownership of the file system instance is proactively transferred to the second node (i.e., the failover node) in response to detection by the second node of the failure associated with the first node. In particular, the ownership of the file system instance is proactively transferred to the second node instead of waiting for incoming data access requests to the second node. In particular, the ownership transfer to the second node is completed either in parallel with the IP address switchover or before the IP address switchover. In other words, the IP address switchover of the first node is not completed prior to the ownership transfer to the second node. Thus, data access requests will not be received by the second node until the ownership of the file system instance is transferred to the second node. More particularly, by transferring the ownership of the file system instance to the second virtual controller no later than the IP address switchover of the first virtual controller, the next data access request and further data access requests received after IP address switchover is served by the second node immediately without further delays. Accordingly, such a proactive transfer of the ownership by the second node reduces failover time as seen by the virtual controllers and any data unavailability (DU) event may be avoided.

Figure 1:
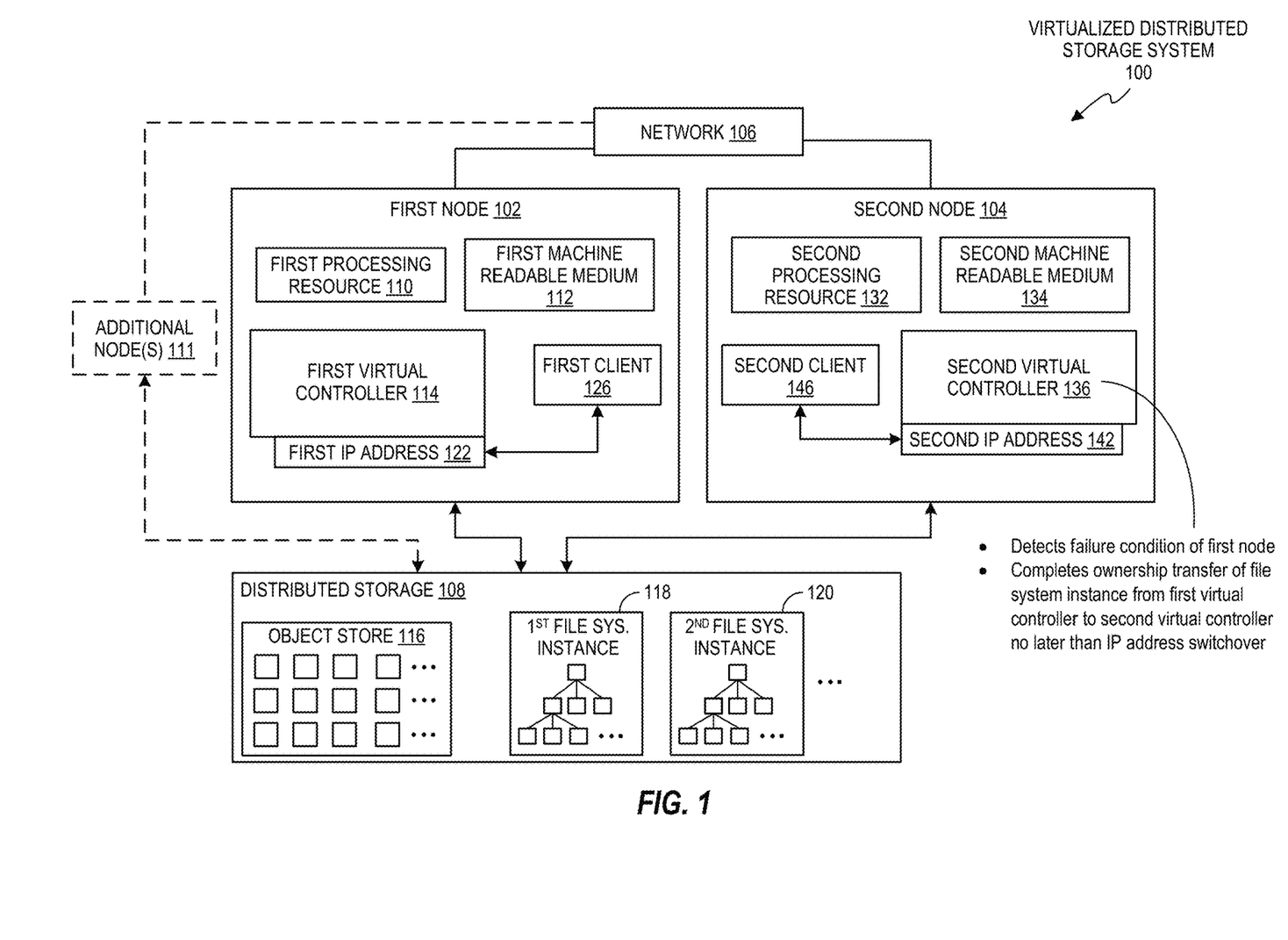
FIG. 1 illustrates an example virtualized distributed storage system in which a proactive failover is enabled in an event of a failure condition.

Referring now to the figures, FIG. 1 illustrates an example virtualized distributed storage system 100 in which a proactive failover is enabled in an event of a failure condition. The virtualized distributed storage system 100 may include a first node 102, a second node 104, a network 106, and a distributed storage 108. The second node 104 may be coupled to the first node 102 over the network 106. The network 106 may be enabled using any wired and/or wireless network technology. Although the present example implementation of the virtualized distributed storage system 100 refers to two nodes for convenience, the various aspects described herein are also applicable to network systems that include one or more additional nodes 111. Each of the first node 102, the second node 104, as well as any additional nodes 111, may be a system such as, but not limited to, a server, a computer appliance, a workstation, a storage system, or a converged or hyperconverged system.

Further, the distributed storage 108 may be coupled to the first node 102 and the second node 104 as shown in FIG. 1, for example. The distributed storage 108 may be accessible via one or both of the first node 102 and the second node 104. The distributed storage 108 may also be coupled to and accessible via one or more of the additional nodes 111.

Furthermore, the distributed storage 108 may be a virtualized storage that includes aspects (e.g., addressing, configurations, etc.) abstracted from data stored in a physical storage (not shown). The distributed storage 108 may be presented to a user environment (e.g., to an operating system, applications, processes, etc.) hosted by one or more of the nodes 102, 104, or 111. In some implementations, the distributed storage 108 may be implemented, maintained, and managed, at least in part, by a virtual controller such as a first virtual controller 114, for example. Further, the distributed storage 108 may also provide data services such as deduplication, compression, replication, and the like.

In some instances, the distributed storage 108 may be object-based. For example, in the distributed storage 108, data may be stored in an object store 116 as objects (shown as small squares). User accessible files and directories may be made up of multiple objects. Each object may be identified by a signature (also referred to as an object fingerprint), which, in some implementations, may include a cryptographic hash digest of the content of that object. The signature can be correlated to a physical address (i.e., disk location) of the object's data in an object index.

In some examples, the objects in the distributed storage 108 may be hierarchically arranged. Such hierarchical arrangement of the objects may be referred to as a file system instance or a hive. For illustration purpose, two such file system instances—a first file system instance 118 and a second file system instance 120 are shown in FIG. 1 and are respectively named as "$1^{st}$ file sys. instance" and "$2^{nd}$ file sys. instance" in FIG. 1. Objects in the file system instances 118, 120 may represent one or more objects stored in the object store 116. One or more objects in given file system instances 118, 120 may be related to a root object in an object tree (e.g., a Merkle tree) or any other hierarchical arrangement (e.g., directed acyclic graphs, etc.). In the case of the object tree, the lowest level tree node of any branch (that is, most distant from the root object) is a data object that stores user data, also referred to as a leaf data object. The parent tree node of the leaf data objects is a leaf metadata object that stores, as its content, the signatures of its child leaf data objects. The root and internal nodes of the object tree may also be metadata objects that store as content the signatures of child objects. A metadata object may be able to store a number of signatures that is at least equal to a branching factor of the hierarchical tree, so that it may hold the signatures of all of its child objects. In some instances, one or more of the file system instances 118, 120 may be dedicated to an entity, such as a particular virtual machine/virtual controller, a user, or a client. In some examples, the distributed storage 108 may also include one or more replicas (not shown) of the file system instances 118, 120.

Further, in some implementations, the first node 102 may include a first processing resource 110, a first machine readable medium 112, and a first virtual controller 114, arranged as shown in FIG. 1. Similarly, the second node 104 may include a second processing resource 132, a second machine readable medium 134, and a second virtual controller 136, arranged as shown in FIG. 1. Further, the reference numerals 122 and 142 represent IP addresses of the first virtual controller 114 and the second virtual controller 136, respectively. The IP addresses 122 and 142 are hereinafter respectively referred to as a first IP address 122 and a second IP address 142.

Some features of the first node 102 may be analogous in many respects to corresponding features of the second node 104. For example, the first processing resource 110, the first machine readable medium 112, the first virtual controller 114, and the first IP address 122, of the first node 102 may be analogous, at least in terms of functionality, to the second processing resource 132, the second machine readable medium 134, and the second virtual controller 136, respectively, of the second node 104. Merely for clarity and convenience, features and components of the first node 102 have been be prefixed with the term "first" (e.g., first virtual controller, first processing resource, etc.) and features and components of the second node 104 have been prefixed with the term "second" (e.g., second virtual controller, second processing resource, etc.), without connoting sequence. Features and components of the first node 102 will now be described, and it may be appreciated and understood that such description may also apply to analogous features and components of the second node 104.

Non-limiting examples of the first processing resource 110 may include a microcontroller, a microprocessor, central processing unit core(s), an application-specific integrated circuit (ASIC), a field programmable gate array (FPGA), etc. The first machine readable medium 112 may be a non-transitory storage medium, examples of which include, but are not limited to, a random access memory (RAM), a read-only memory (ROM), an electrically erasable programmable read-only memory (EEPROM), a flash memory, a hard disk drive, etc. The first processing resource 110 may execute instructions (i.e., programming or software code) stored on the first machine readable medium 112. Additionally or alternatively, the first processing resource 110 and/or the second processing resource 132 may include electronic circuitry for performing the functionality described herein.

The first virtual controller 114 may be implemented using hardware devices (e.g., electronic circuitry, logic, or processors) or any combination of hardware and programming (e.g., instructions stored on machine readable medium) to implement various functionalities described herein. For example, in an implementation, the first virtual controller 114 may be a virtual machine that includes, at least in part, instructions stored on the first machine readable medium 112 and executing on the first processing resource 110.

Further, the first node 102 may host guest virtual machines, alternatively referred to as clients, such as a first client 126. The first client 126 and the first virtual controller 114 may be virtual machines running on a same hypervisor (not shown) of the first node 102. The first virtual controller 114 may export a file protocol mount point to make the data of the distributed storage 108 accessible. In an example implementation, the distributed storage 108 may store sets of client data, each being separate file system instance that is associated with a respective client (e.g., guest virtual machine). In similar fashion, the second node 104 may also host one or more guest virtual machines, such as, a second client 146.

In some examples, the first virtual controller 114 may include a first consensus protocol unit (not shown) and a first file protocol unit (not shown). Similarly, the second virtual controller 136 may include a second consensus protocol unit (not shown) and a second file protocol unit (not shown). The first consensus protocol unit and the second consensus protocol unit may coordinate within the virtualized distributed storage system 100 via the network 106 to achieve agreement on data and processes (e.g., IP addresses, ownerships of file system instances, etc.) between the first node 102 and the second node 104. By way of example, the first consensus protocol unit and the second consensus protocol unit may be implemented based on Paxos or Raft consensus protocols. The first file protocol unit and the second file protocol unit may be implemented based on a file protocol, such as SMB v3 for example. The consensus protocol units and the file protocol units may be implemented as instructions stored on machine readable media 112, 134 and executed by processing resources 110, 132.

During an initial operation of the virtualized distributed storage system 100, the first virtual controller 114 may be assigned an ownership of one or more of file system instances, for example, the file system instances 118, 120. Therefore, the first virtual controller 114 may act as a primary owner of the file system instances 118, 120. Therefore, the first virtual controller 114 can address any data access request pertaining to data of file system instances 118, 120. For example, being an owner of the file system instances 118, 120, the first virtual controller 114 can perform operations, such as, but not limited to, open, read, write, rename, move, close, or combinations thereof on the file system instances 118, 120. In the description hereinafter, various aspects of the ownership and/or ownership transfer are described with reference to the first file system instance 118. It is understood and appreciated that such aspects may also be applicable to one or more other file system instances, such as, the second file system 120. Further, information related to ownership of each file system instance in the distributed storage 108 may be registered and updated in the consensus protocol units such as the first and second consensus protocol units.

The first client 126 may connect with the first virtual controller 114 via the first IP address 122 and communicate data access requests using a file protocol, such as SMB v3. The data access requests may include requests such as open, read, write, rename, move, close, or combinations thereof. The first file protocol unit may receive the data access requests and make corresponding system calls to the portions of the first virtual controller 114 that manage the distributed storage 108. For example, the file protocol unit may make open, close, read, or write system calls against the mount point associated with client data in a corresponding file system instance in the distributed storage 108. In some implementations, the first file protocol unit may be Samba software. In a similar manner, the second virtual controller 136 similarly can receive data access requests via second IP address 142 and act on the requests via the second file protocol unit.

To provide high or continuous availability of data, the first virtual controller 114 and the second virtual controller 136 may coordinate replication of data in the distributed storage 108. For example, the distributed storage 108 may include one or more replicas (not shown) of the file system instances 118, 120. In various implementations, replication may be performed by the first virtual controller 114, the second virtual controller 136, or the first virtual controller 114 in cooperation with the second virtual controller 136. The replication may be synchronized, that is, the replicated copies of the file system instances may be kept current with any changes.

Further, during operation of the currently presented virtualized distributed storage system 100, there may exist or occur any failure condition with the first node 102 and/or the first virtual controller 114 that is a current owner of the first file system instance 118. By way of example, such failure conditions may include, but are not limited to, separation of the first node 102 from the network 106, complete or partial failure, damage, and/or malfunctioning of the first node 102 or any internal components thereof such as the first virtual controller 114, the first processing resource 110, and the first machine readable medium 112. In accordance with various examples presented herein, the second virtual controller 136 may detect such failure condition associated with the first node 102. Additional details of the operations performed to detect the failure condition will be described in conjunction with FIGS. 2, 4, and 5.

Further, the second virtual controller 136 may initiate an ownership transfer of the first file system instance 118 from the first virtual controller 114 to the second virtual controller 136 while holding completion of an IP address switchover of the first virtual controller 114. In one example, the term "IP address switchover of the first virtual controller" may refer to assigning an IP address of the first virtual controller 114 (i.e., the first IP address 122) to any other virtual controller in the virtualized distributed storage system 100. Accordingly, in some instances, performing the IP address switchover of the first virtual controller 114 may include assigning the IP address 122 of the first virtual controller 114 to the second virtual controller 136 (see FIG. 2, for example). In some instances, performing the IP address switchover of the first virtual controller 114 may include assigning the IP address 122 of the first virtual controller 114 to a third virtual controller (not shown) different from the second virtual controller 136. The third virtual controller may be hosted by a third node which may be one of the additional nodes 111.

In accordance with another example, the term "IP address switchover of the first virtual controller" may refer to communicating an IP address of an alternate virtual controller that is different from the first virtual controller to a client, such as, the clients 126 and/or 146. By doing so, the clients 126 and/or 146 may direct any new/upcoming data access requests to the alternate virtual controller. By way of example, the alternate virtual controller may be the second virtual controller 136. By way of another example, the alternate virtual controller may be the third virtual controller hosted by any of the additional nodes 111. In some implementations, a witness service or the like may be responsible for communicating the IP address of the alternate virtual controller to the clients 126 and/or 146.

Further, in the present implementation, the second virtual controller is assumed to have managed most recent replica of the first file system instance in the distributed storage 108. Accordingly, the second virtual controller 136 may complete the ownership transfer of the first file system instance 118 to the second virtual controller 136 no later than the IP address switchover of the first virtual controller 114. Additional details of the operations performed to transfer/takeover the ownership of the first file system instance 118 and the IP address switchover will be described in conjunction with FIGS. 2, 4, and 6-9.

Moreover, in implementations where the first virtual controller 114 acts as the owner for a plurality of file system instances, the ownership transfer of the file system instances of the plurality of file system instances may be performed in parallel, in series, or in a series parallel combination, with the ownership transfers of other file system instances. In some examples, the ownership of the plurality of the file system instances may be assigned to a single virtual controller, for example, the second virtual controller 136. However, in certain examples, the ownership of different file system instances in the distributed storage 108 may be assigned to different virtual controllers depending on most recent version of replicas managed by the virtual controllers. By way of example, if the second virtual controller 136 manages the most recent replica of first file system instance 118 and a third virtual controller (not shown) hosted on any of the additional node 111 manages the most recent replica of the second file system instance 120, the ownerships of the first file system instance 118 and the second file system instance 120 may respectively be transferred to the second virtual controller 136 and the third virtual controller.

Advantageously, the virtualized distributed storage system 100 may facilitate a proactive transfer of the ownership of the first file system instance 118 from the first virtual controller 114 to the second virtual controller 136 in the event of a failure condition associated with the first node 102. In particular, the ownership of the first file system instance 118 is proactively transferred to the second virtual controller 136 instead of waiting for any incoming data access requests to the second node 104. In particular, the ownership transfer to the second virtual controller 136 is completed either in parallel with the IP address switchover of the first virtual controller 114 or before the IP address switchover of the first virtual controller 114. In other words, the IP address switchover of the first virtual controller 114 is not completed prior to the ownership transfer to the second virtual controller 136. Thus, no data access request is received by the second node 104 until the ownership of the first file system instance 118 is transferred to the second virtual controller 136 of the second node 104. Such a proactive transfer of the ownership by the second virtual controller 136, reduces failover time and any data unavailability (DU) event may be avoided.

Figure 2:
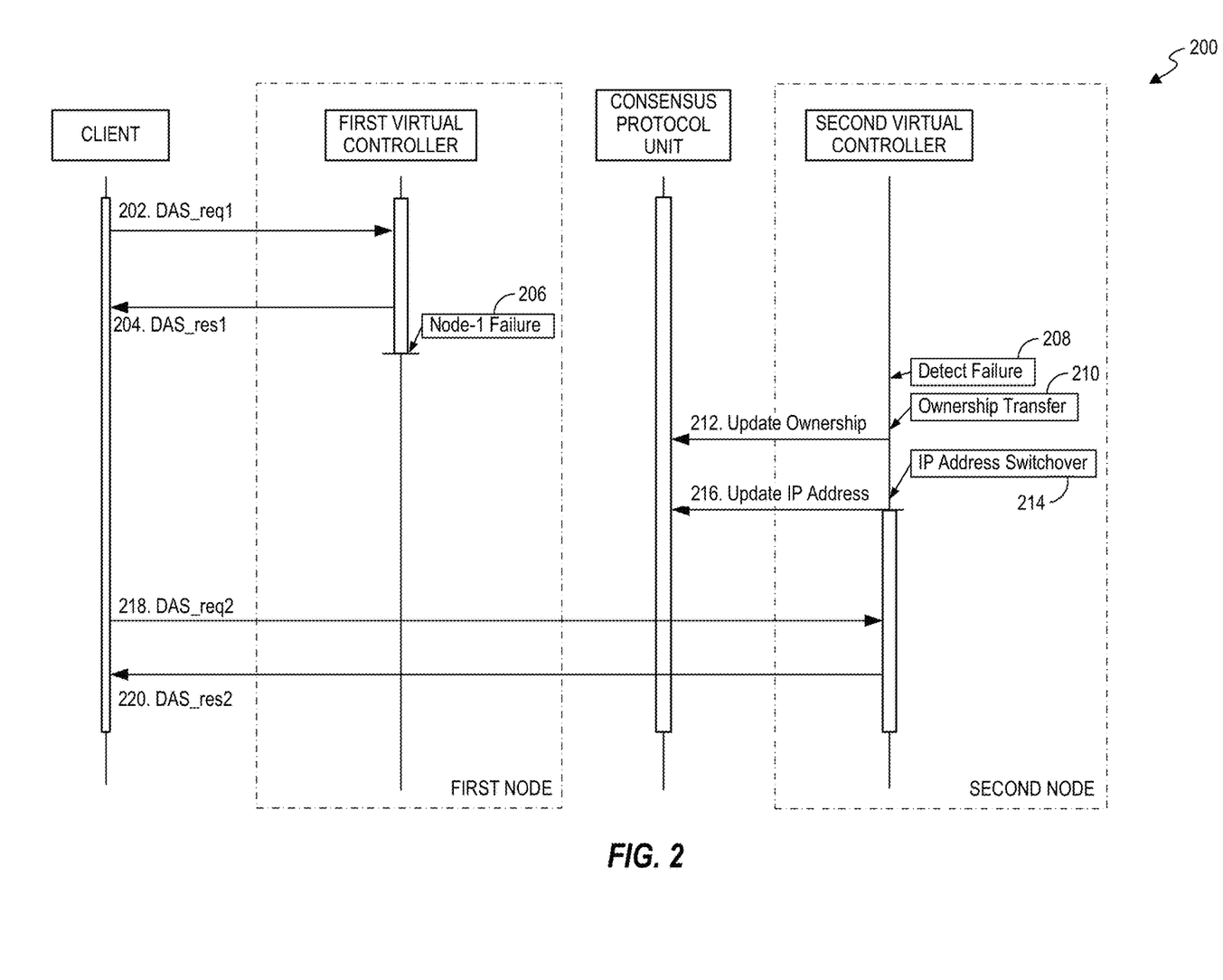
FIG. 2 is a sequence diagram depicting example interactions to manage failover in a virtualized distributed storage system.

FIG. 2 is an example sequence diagram depicting example interactions to manage failover in the virtualized distributed storage system 100. The objects include a client, a first virtual controller, a second virtual controller, and a consensus protocol unit. The client may be analogous in to the first client 126 (on the first node 102 or migrated to the second node 104). The first virtual controller may be analogous to the first virtual controller 114 which is an owner of the first file system instance 118. The second virtual controller may be analogous to the second virtual controller 136. The consensus protocol unit may be analogous to the first and/or second consensus protocol units described above.

During operation of the virtualized distributed storage system 100, at 202, the client may send a data access request (DAS_req1). The data access request may be received by the first virtual controller 114 as the first virtual controller 114 is the owner of the first file system instance 118. At 204, the first virtual controller 114 may serve data request by sending a response (DAS_res1) to the client after performing an appropriate action to fulfil the data access request (DAS_req1). At 206, the first node 102 hosting the first virtual controller 114 may encounter a failure condition due to various reasons described earlier in conjunction with FIG. 1. At 208, the failure condition may be detected by the second virtual controller 136. In order to detect the failure condition associated with the first node 102, the second virtual controller 136 may execute a method as described in FIG. 5, for example.

Further, once the failure condition is detected, the second virtual controller 136 may transfer the ownership of the first file system instance 118 to the second virtual controller 136 at 210 (i.e., the second virtual controller 136 takes-over the ownership of the first file system instance 118). Furthermore, in one example, at 212, the new ownership of the first file system instance 118 may be updated/registered with the first and/or second consensus protocol units.

Moreover, at 214, an IP address switchover is performed. As indicated earlier, a method of assigning the IP address of the first virtual controller 114 to a different virtual controller 136 is referred to as the IP address switchover of the first virtual controller 114. In the non-limiting example of FIG. 2, the IP address of the first virtual controller 114 is assigned to the second virtual controller 136. As noted earlier, the IP address of the first virtual controller 114 may be assigned to a third virtual controller that is different from the second virtual controller 136, without limiting the scope of the present disclosure. Additionally, at 216, an information about the updated IP address of the second virtual controller 136 may be updated/registered with the first and/or second consensus protocol units. Additional details of methods performed to execute sequence 208-216 will be described in conjunction with the methods of FIGS. 4-9.

By the end of the sequence 216, a failover process is considered to be complete. Accordingly, by the end of the sequence 216, the second virtual controller 136 becomes the owner of the first file system instance 118 and can serve any incoming data access requests that were supposed to be handled by the first virtual controller 114. For example, at 218, a new data access request (DAS_req2) is directed to the second virtual controller 136. Consequently, at 220, the second virtual controller 136 may serve data request by sending a response (DAS_res2) to the client after performing necessary actions to fulfil the data access request (DAS_req2).

Figure 3:
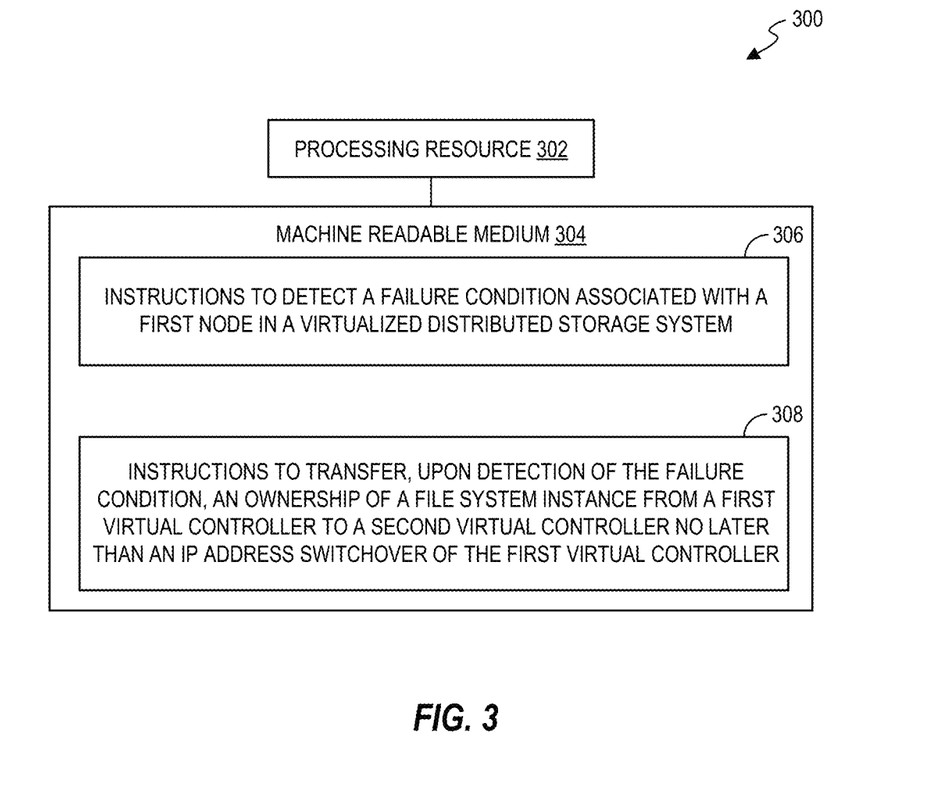
FIG. 3 is a block diagram depicting a processing resource and a machine readable medium encoded with example instructions to manage failover in a virtualized distributed storage system.

FIG. 3 is a block diagram 300 depicting a processing resource 302 and a machine readable medium 304 encoded with example instructions to manage failover in a virtualized distributed storage system, such as, the virtualized distributed storage system 100. The machine readable medium 304 is non-transitory and is alternatively referred to as a non-transitory machine readable medium 304. In some examples, the machine readable medium 304 may be accessed by the processing resource 302. The processing resource 302 and the machine readable medium 304 may be included in nodes of the virtualized distributed storage system 100, such as the first node 102 or the second node 104. By way of example, the processing resource 302 may serve as or form part of the first and second processing resources 110, 132, respectively. Similarly, the machine readable medium 304 may serve as or form part of the first and second machine readable media 112, 134, respectively.

The machine readable medium 304 may be encoded with example instructions 306 and 308. The instructions 306, 308 of FIG. 3, when executed by the processing resource 302, may implement aspects of managing failover in the virtualized distributed storage system 100 in response to detection of the failure condition associated with the first node 102, for example. In particular, the instructions 306, 308 of FIG. 3 may be useful for performing the functionality of the second virtual controller 136 of FIG. 1 and the methods described in FIGS. 4-9. For example, the second virtual controller 136 may be executing on the processing resource 302.

The instructions 306, when executed, may cause the processing resource 302 to detect the failure condition associated with a first node, such as the first node 102 in the virtualized distributed storage system 100. In particular, the instructions 306 may include instructions to execute at least a part of the methods described in FIG. 4 and FIG. 5 (described later). Further, in some implementations, the instructions 308, when executed, may cause the processing resource 302 to transfer, in response to detection of the failure condition, an ownership of a first file system instance 118 from a first virtual controller 114 of the first node to a second virtual controller 136 no later than an IP address switchover of the first virtual controller 114. In particular, the instructions 308 may include various instructions to execute at least a part of the methods described in FIG. 4 and FIGS. 6-9 (described later).

Referring now to FIGS. 4-9, flow diagrams depicting various example methods are presented. In some implementations, one or more blocks of these example methods may be executed substantially concurrently or in a different order than shown. In some implementations, a method may include more or fewer blocks than are shown. In some implementations, one or more of the blocks of these example methods may, at certain times, be ongoing and/or may repeat.

The methods of FIGS. 4-9 may be implemented via use of executable instructions stored on a machine readable medium (e.g., the machine readable media 112, 134, or 304) that are executable by a processing resource (e.g., such as processing resources 110, 132, or 302) and/or in the form of electronic circuitry. In some examples, aspects of these methods may be performed by the first virtual controller 114, the second virtual controller 136, or components thereof. For simplicity of illustration, the second node 104 is described as a failover node. Therefore, the methods of FIGS. 4-9 are described as being executed by the second processing resource 132 and/or the second virtual controller 136 of the second node 104, for example. Also, the methods of FIGS. 4-9 are described with reference to FIGS. 1 and 3.

Figure 4:
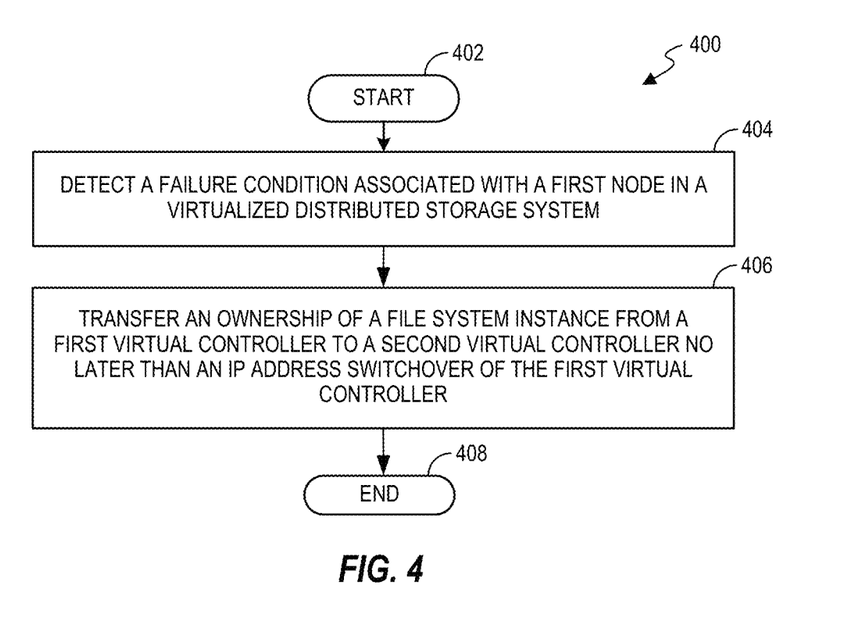
FIG. 4 is a flow diagram depicting an example method to manage failover in a virtualized distributed storage system.

FIG. 4 is a flow diagram depicting an example method 400 to manage failover in the virtualized distributed storage system 100. The method 400 starts at a block 402 and continues to a block 404. At block 404, the method 400 includes detecting a failure condition associated with the first node 102 in the virtualized distributed storage system 100. As previously noted, various examples of the failure condition may include, but are not limited to, separation of the first node 102 from the network 106, complete or partial failure, damage, and/or malfunctioning of the first node 102 or any internal components thereof such as the first virtual controller 114, the first processing resource 110, and the first machine readable medium 112. In the presently contemplated example, a processor based system such as the second virtual controller 136 performs the detection the failure condition at the block 404. Additional details of the method performed at the block 404 are described in conjunction with FIG. 5.

Further, in response to detection of the failure condition, the method 400 continues to a block 406. At block 406, the method 400 includes transferring an ownership of the first file system instance 118 from the first virtual controller 114 to the second virtual controller 136 no later than an IP address switchover of the first virtual controller 114. In the presently contemplated example, a processor-based system such as the second virtual controller 136 performs the method of transferring (i.e., taking-over) the ownership.

In particular, managing the failover includes successfully handling the IP address switchover of the first virtual controller 114 and transferring the ownership of the first file system instance 118 to the second virtual controller 136 from the first virtual controller 114. By way of example, the process of IP address switchover of the first virtual controller 114 includes assigning the first IP address 122 to a different virtual controller. In one example, the IP address switchover of the first virtual controller 114 includes assigning the IP address of the first virtual controller 114 (e.g., the first IP address 122) to the second virtual controller 136. The second virtual controller 136 may itself assume the first IP address 122 to enable the IP address switchover of the first virtual controller 114. Alternatively, the IP address switchover of the first virtual controller 114 may be effected by a hypervisor (not shown). In another example, the IP address switchover of the first virtual controller 114 includes assigning the first IP address 122 to a third virtual controller that is different from the second virtual controller 136. The third virtual controller may be hosted by one of the additional nodes 111. In another example, the IP address switchover of the first virtual controller 114 includes communicating an IP address of the second virtual controller 136 to a client, such as, the clients 126 and/or 146 so that the clients 126 and/or 146 can direct the data access requests to the second virtual controller 136. In yet another example, the IP address switchover of the first virtual controller 114 includes communicating an IP address of the third virtual controller to the clients 126 and/or 146 so that the clients 126 and/or 146 can direct the data access requests to the third virtual controller.

In the presently contemplated method 400 and the implementation of the virtualized distributed storage system 100, the IP address switchover is not allowed to complete prior to completion of the transfer of the ownership of the first file system instance 118 to the second virtual controller 136. Unless the IP switchover of the first virtual controller 114 is completed, no data access requests can be received by the second node 104. In other words, as the IP address switchover is not finished, incoming data access requests are deliberately put on hold by the second node 104. Additional details of the method performed at the block 406 are described in conjunction with FIG. 5. Once the ownership of the first file system instance 118 is transferred to the second node 104 from the first node 102, the method 400 ends at the block 408.

Figure 5:
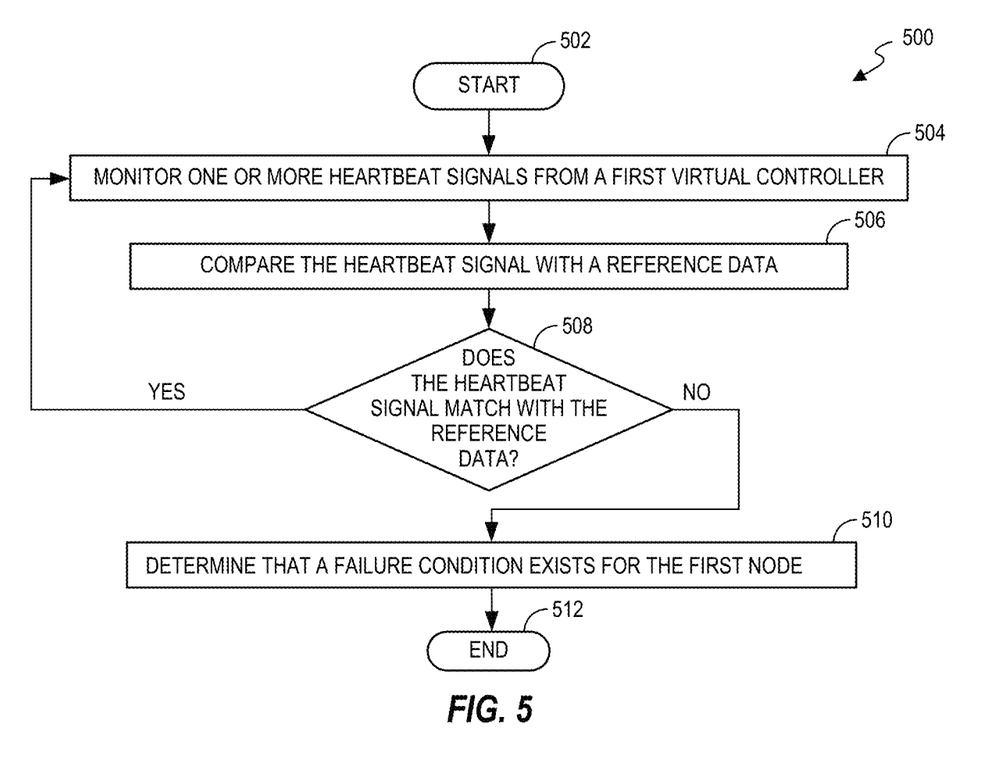
FIG. 5 is a flow diagram depicting an example method to detect a failure condition associated with a node in virtualized distributed storage system.

Referring now to FIG. 5, a flow diagram depicting an example method 500 to detect a failure condition associated with a node, such as the first node 102, in the virtualized distributed storage system 100 is presented. The method 500 is described in conjunction with the method 400 of FIG. 4. The method 500 may represent various example sub-blocks of the block 404 of the method 400 of FIG. 4.

The method 500 starts at block 502 and proceeds to execute block 504. At block 504, the method 500 may include monitoring, by the processor-based system such as the second virtual controller 136, a heartbeat signal from the first virtual controller 114. The heartbeat signal may be a periodic signal generated by hardware such as the first processing resource 110 or software of the first node 102 to indicate normal operation of the first node 102. The heartbeat signal may be periodically received by the second node 104 over the network 106 or over any other private communication link (not shown) between the first node 102 and the second node 104.

Further, at block 506, the second virtual controller 136 may compare the received heartbeat signal against a reference data. By way of example, the reference data may include one or more of a threshold value, a pre-defined pattern, a predefined signal, and one or more ranges of values. The reference data may be indicative of healthy/normal operation of the first node 102. Furthermore, at block 508, a check may be performed by the second virtual controller 136 to determine if the heartbeat signal received from the first node 102 matches with the reference data. By way of example, the heartbeat signal is considered to be matching with the reference data if various parameters of the heartbeat signal are similar to that of the reference data or are within a predefined tolerance range from that of the reference data. Alternatively, the heartbeat signal is considered to be different from the reference data or not matching with the reference data.

At block 508, if it is determined that the heartbeat signal received from the first node 102 matches with the reference data ("YES" at block 508), the second virtual controller 136 may determine that the first node 102 functions normally and there exists no failure condition. In such case, the second virtual controller 136 continues to monitor the heartbeat signal from the first node 102 at block 504. However, at block 508, if it is determined that the heartbeat signal received from the first node 102 does not match with the reference data ("NO" at block 508), the second virtual controller 136 may determine that the failure condition exists for the first node 102, as indicated at block 510. Further, the method 500 ends at block 512.

It is to be noted that although the heartbeat signal is used by the second virtual controller 136 to detect the failure condition in the example of FIG. 5, in certain other implementations, the second virtual controller 136 may detect the failure condition based on other suitable parameters without limiting the scope of the present description.

Moving to FIGS. 6-9, various example methods of transferring ownership of the first file system instance 118 from the first node 102 to the second node 104 are presented. In particular, the example methods of FIGS. 6-9 represent different sub-blocks for performing the method of transferring ownership of the first file system instance 118 at block 406 of FIG. 4.

Figure 6:
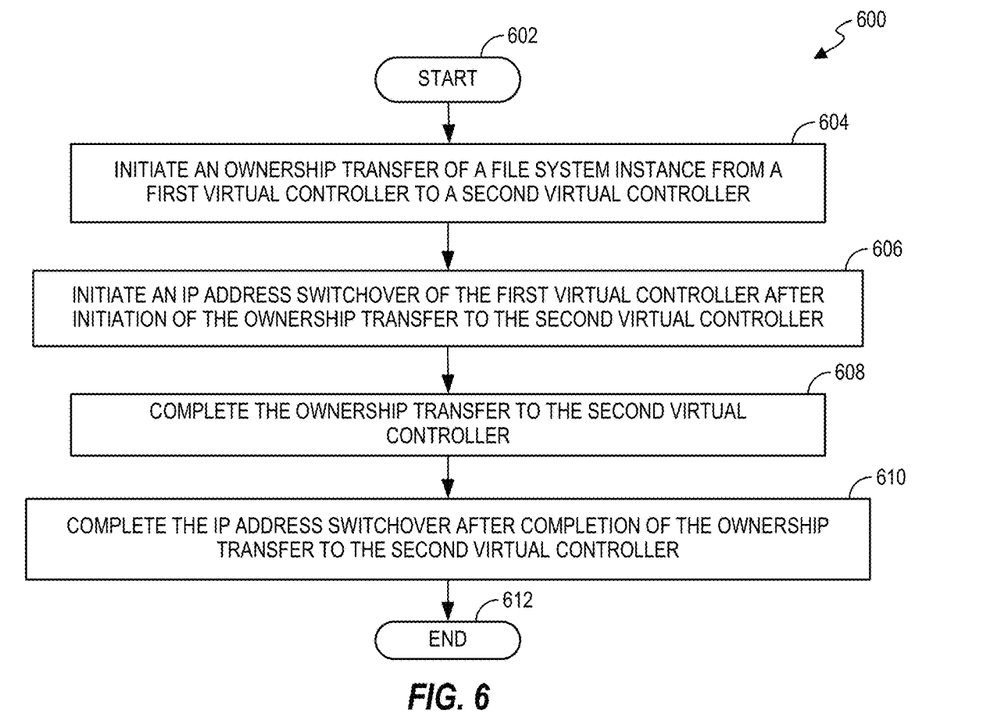
FIG. 6 is a flow diagram depicting an example method to transfer an ownership of a file system instance from one node to another node in a virtualized distributed storage system.

Referring now to FIG. 6, a flow diagram depicting an example method 600 to transfer the ownership of the first file system instance 118 from one node (e.g., the first node 102) to another node (e.g., the second node 104) in the virtualized distributed storage system 100 is presented. The method 600 starts at block 602 and moves to block 604. At block 604, the method 600 includes initiating the ownership transfer of the first file system instance 118 from the first virtual controller 114 to the second virtual controller 136. In one example, the ownership transfer of the first file system instance 118 may be initiated by the second virtual controller 136 by executing corresponding program instructions from the second machine readable medium 134. Further, at block 606, the method includes initiating an IP address switchover of the first virtual controller 114 after initiation of the ownership transfer of the first file system instance 118 to the second virtual controller 136. In one example, the IP address switchover of the first virtual controller 114 may be initiated by the second virtual controller 136 by executing corresponding program instructions from the second machine readable medium 134. In another example, the IP address switchover of the first virtual controller 114 may be initiated by the third virtual controller or the hypervisor.

Furthermore, at block 608, the method 600 includes completing the ownership transfer to the second virtual controller 136. Consequently, after the execution of the block 608, the second virtual controller 136 has been assigned the ownership of the first file system instance 118, thereby the second virtual controller 136 can serve incoming data access requests. However, the data access requests can be directed to the second virtual controller 136 after successful completion of IP address switchover of the first virtual controller 114. Therefore, at block 610, the method 600 includes completing the IP address switchover of the first virtual controller 114 after completion of the ownership transfer to the second virtual controller 136. For example, once the block 610 is executed by the second virtual controller 136, the IP address of the first virtual controller 114 (i.e., the first IP address 122) becomes an IP address of the second virtual controller 136, as well. In some example, the second virtual controller 136 also continues to be accessible via the second IP address 142. After the first IP address 122 is assigned to the second virtual controller 136 at block 610, data access requests that are supposed to be directed to the first virtual controller 114 can now be received by the second virtual controller 136. Advantageously, upon receipt of the data access request, the second virtual controller 136 is capable of serving that data access request because the second virtual controller 136 is already assigned an ownership of the first file system instance 118. After the IP address switchover of the first virtual controller 114 is completed at block 610, the method 600 ends at block 612.

Figure 7:
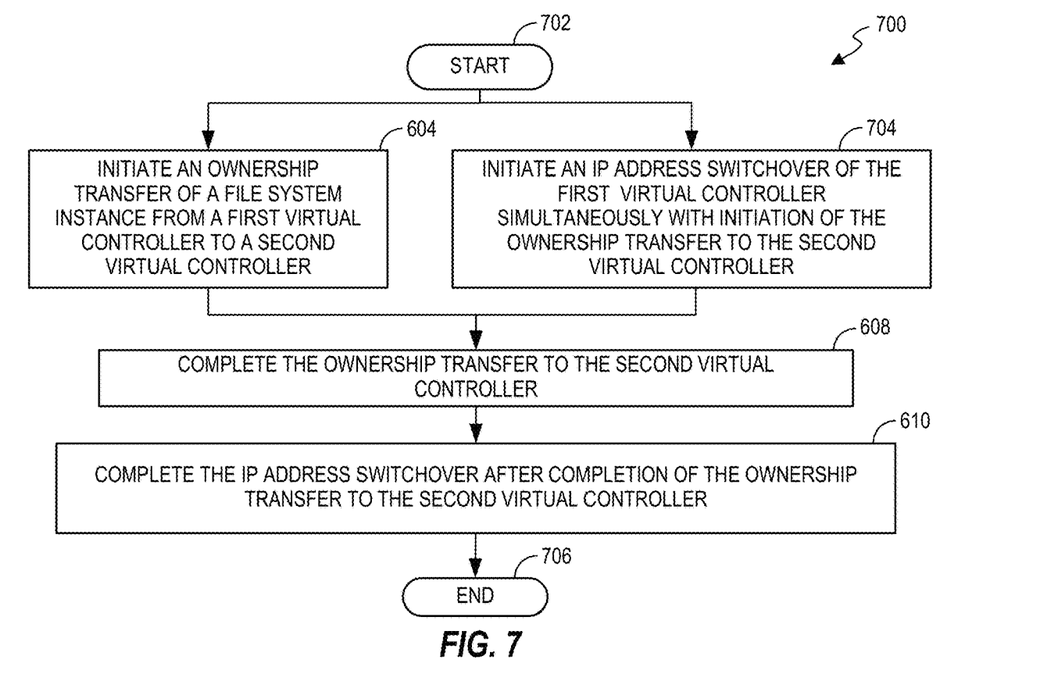
FIG. 7 is a flow diagram depicting another example method to transfer an ownership of a file system instance from one node to another node in a virtualized distributed storage system.

Moving now to FIG. 7, another example method 700 is presented to transfer the ownership of the first file system instance 118 from one node (e.g., the first node 102) to another node (e.g., the second node 104) in the virtualized distributed storage system 100. As shown in FIG. 7, the method 700 includes various blocks which are similar to the blocks already described in FIG. 6, description of which is not repeated herein. The method 700 begins at block 702 proceeds to perform blocks 604 and 704 in parallel. In particular, in comparison to method 600 of FIG. 6, the method 700 of FIG. 7, at block 704, includes initiating the IP address switchover simultaneously with initiation of the ownership transfer to the second virtual controller 136. To enable such simultaneous/parallel execution of the blocks 604 and 704, the programming instructions corresponding to the blocks 604 and 704 may be executed in parallel by the second virtual controller 136. In one example, the programming instructions corresponding to the blocks 604 and 704 may be executed in parallel by different processing cores and/or different processors within the second processing resource 132. Further, in the method 700, the blocks 708 and 710 may be executed in sequence after execution of the blocks 604 and 704. The method 700 ends at block 706.

Figure 8:
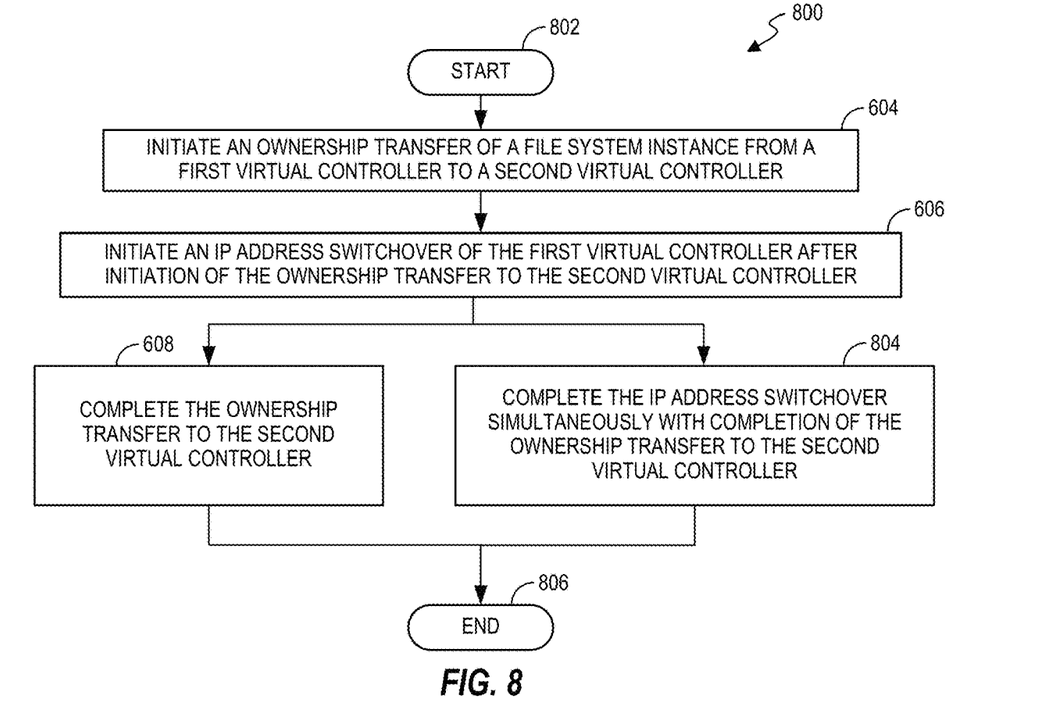
FIG. 8 is a flow diagram depicting another example method to transfer an ownership of a file system instance from one node to another node in a virtualized distributed storage system.

Turning to FIG. 8, another example method 800 is presented to transfer the ownership of the first file system instance 118 from one node (e.g., the first node 102) to another node (e.g., the second node 104) in the virtualized distributed storage system 100. As shown in FIG. 8, the method 800 includes various blocks which are similar to the blocks already described in FIG. 6, description of which is not repeated herein. The method 800 begins at block 802 proceeds to execute the blocks 604 and 608 in a similar fashion as shown and described in FIG. 6. Thereafter, the blocks 608 and a block 804 are executed in parallel. In particular, in comparison to method 600 of FIG. 6, the method 800 of FIG. 8, at block 804, includes completing the IP address switchover simultaneously with completion of the ownership transfer to the second virtual controller 136. To enable such simultaneous/parallel execution of the blocks 608 and 804, the programming instructions corresponding to the blocks 608 and 804 may be executed in parallel by the second virtual controller 136. In one example, the programming instructions corresponding to the blocks 608 and 804 may be executed in parallel by different processing cores and/or different processors within the second processing resource 132. The method 800 ends at block 806.

In so far, in the methods described in FIGS. 6-8, the method blocks are executed in sequence or while some method blocks are executed in sequence some method blocks are executed in parallel/simultaneously. In certain examples, methods of transferring the ownership of the first file system instance 118 and the method of IP address switchover may be performed simultaneously/in parallel (see FIG. 9) by the second virtual controller 136.

Figure 9:
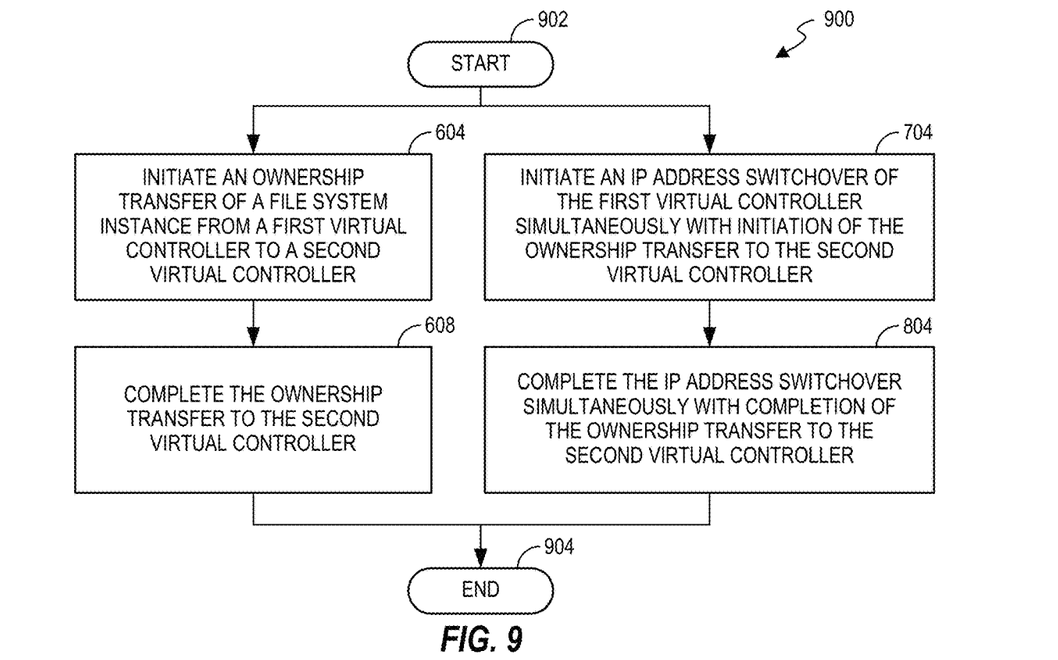
FIG. 9 is a flow diagram depicting yet another example method to transfer an ownership of a file system instance from one node to another node in a virtualized distributed storage system.

In FIG. 9, yet another example method 900 is presented to transfer the ownership of the first file system instance 118 from one node (e.g., the first node 102) to another node (e.g., the second node 104) in the virtualized distributed storage system 100. As shown in FIG. 9, the method 900 includes various blocks which are similar to the blocks already described in FIGS. 6-8, description of which is not repeated herein. The method 900 begins at block 902 proceeds to execute the blocks 604 and 704 in a similar fashion as described in FIG. 7. In particular, as previously noted, the IP address switchover initiated simultaneously with initiation of the ownership transfer to the second virtual controller 136. Thereafter, the blocks 608 and a block 804 are executed in parallel as described in FIG. 8. In particular, the IP address switchover is also completed simultaneously with completion of the ownership transfer to the second virtual controller 136. By doing so, the method 900 facilitates performing the ownership transfer simultaneously with the IP address switchover. After executing the blocks 608 and 804 simultaneously, the method 900 ends at the block 904.

Various features as illustrated in the examples described herein may be implemented in various hyperconverged storage systems. Advantageously, such hyperconverged storage systems may offer a high-availability infrastructure of network nodes with greatly reduced failover times. Also, due to faster failover mechanism as offered various example features may result in reduced DU events.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
    detecting, by a processor-based system, a failure condition associated with a first node in a virtualized distributed storage system, wherein the virtualized distributed storage system further comprises a second node coupled to the first node over a network, wherein the first node comprises a first virtual controller and the second node comprises a second virtual controller, and wherein the first virtual controller is an owner of a file system instance in a distributed storage; and
    in response to detection of the failure condition, transferring, by the processor-based system, an ownership of the file system instance from the first virtual controller to the second virtual controller no later than an IP address switchover of the first virtual controller,
    wherein the IP address switchover of the first virtual controller comprises assigning an IP address of the first virtual controller to another virtual controller in the virtualized distributed storage system.

2. The method of claim 1, wherein the failure condition comprises one or more of separation of the first node from the network, complete or partial failure, damage, or malfunctioning of the first node or any internal components of the first node.

3. The method of claim 1, wherein detecting the failure condition comprises monitoring, by the processor-based system, a heartbeat signal from the first virtual controller.

4. The method of claim 1, wherein the another virtual controller is the second virtual controller.

5. The method of claim 1, wherein the another virtual controller is a third virtual controller different from the second virtual controller.

6. The method of claim 1, wherein the IP address switchover of the first virtual controller comprises communicating an IP address of the second virtual controller to a client.

7. The method of claim 1, wherein the IP address switchover of the first virtual controller comprises communicating an IP address of a third virtual controller different from the second virtual controller to a client.

8. The method of claim 1, wherein transferring the ownership comprises initiating an ownership transfer of the file system instance from the first virtual controller to the second virtual controller, and wherein the virtual controller is the second virtual controller.

9. The method of claim 8, further comprising:
    initiating the IP address switchover after initiation of the ownership transfer to the second virtual controller;
    completing the ownership transfer to the second virtual controller; and
    completing the IP address switchover after completion of the ownership transfer to the second virtual controller.

10. The method of claim 8, further comprising initiating the IP address switchover simultaneously with initiation of the ownership transfer to the second virtual controller.

11. The method of claim 10, further comprising:
    completing the ownership transfer to the second virtual controller; and
    completing the IP address switchover simultaneously with completion of the ownership transfer to the second virtual controller.

12. The method of claim 10, further comprising:
    completing the ownership transfer to the second virtual controller; and
    completing the IP address switchover after completion of the ownership transfer to the second virtual controller.

13. A virtualized distributed storage system comprising:
    a first node comprising a first virtual controller;
    a second node coupled to the first node via a network and comprising a second virtual controller; and
    a distributed storage accessible by one or both of the first virtual controller and the second virtual controller, wherein the distributed storage comprises a file system instance, and wherein the first virtual controller is an owner of the file system instance,
    wherein the second virtual controller:
        detects a failure condition associated with the first node;
        initiates an ownership transfer of the file system instance from the first virtual controller to the second virtual controller while holding completion of an IP address switchover of the first virtual controller; and
        completes the ownership transfer of the file system instance to the second virtual controller no later than the IP address switchover of the first virtual controller, wherein the IP address switchover of the first virtual controller comprises assigning an IP address of the first virtual controller to the second virtual controller.

14. The virtualized distributed storage system of claim 13, wherein the second virtual controller:
    initiates the IP address switchover after initiation of the ownership transfer to the second virtual controller; and
    completes the IP address switchover after completion of the ownership transfer to the second virtual controller.

15. The virtualized distributed storage system of claim 13, wherein the second virtual controller initiates the IP address switchover simultaneously with initiation of the ownership transfer to the second virtual controller.

16. The virtualized distributed storage system of claim 15, wherein the second virtual controller completes the IP address switchover simultaneously with completion of the ownership transfer to the second virtual controller.

17. The virtualized distributed storage system of claim 15, wherein the second virtual controller completes the IP address switchover after completion of the ownership transfer to the second virtual controller.

18. A non-transitory machine readable medium storing instructions executable by a processing resource of a node in a virtualized distributed storage system, the instructions comprising:
- instructions to detect a failure condition associated with a first node in a virtualized distributed storage system, wherein the virtualized distributed storage system further comprises a second node coupled to the first node over a network, wherein the first node comprises a first virtual controller and the second node comprises a second virtual controller, and wherein the first virtual controller is an owner of a file system instance in a distributed storage; and
- instructions to transfer, in response to detection of the failure condition, an ownership of the file system instance from the first virtual controller to the second virtual controller no later than an IP address switchover of the first virtual controller, wherein the IP address switchover of the first virtual controller comprises assigning an IP address of the first virtual controller to the second virtual controller.

19. The non-transitory machine readable medium of claim 18, wherein the instructions to transfer the ownership comprise instructions to:
- initiate an ownership transfer to the second virtual controller;
- initiate the IP address switchover after initiation of the ownership transfer to the second virtual controller;
- complete the ownership transfer to the second virtual controller; and
- complete the IP address switchover after completion of the ownership transfer to the second virtual controller.

20. The non-transitory machine readable medium of claim 18, wherein the instructions to transfer the ownership comprise instructions to:
- initiate an ownership transfer to the second virtual controller; and
- initiate the IP address switchover simultaneously with initiation of the ownership transfer to the second virtual controller;
- complete the ownership transfer to the second virtual controller; and
- complete the IP address switchover simultaneously with completion of the ownership transfer to the second virtual controller.

* * * * *